United States Patent
Stokes et al.

(10) Patent No.: US 9,886,974 B2
(45) Date of Patent: Feb. 6, 2018

(54) READ HEAD FREE LAYER HAVING FRONT AND REAR PORTIONS BIASED AT DIFFERENT LEVELS

(71) Applicant: Seagate Technology LLC, Cupertino, CA (US)

(72) Inventors: Scott Wilson Stokes, Brooklyn Park, MN (US); Victor Boris Sapozhnikov, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/927,696

(22) Filed: Oct. 30, 2015

(65) Prior Publication Data

US 2017/0125046 A1    May 4, 2017

(51) Int. Cl.
| | | |
|---|---|---|
| *G11B 5/39* | (2006.01) | |
| *G11B 5/60* | (2006.01) | |
| *G11B 5/147* | (2006.01) | |
| *G11B 5/11* | (2006.01) | |

(52) U.S. Cl.
CPC ............ *G11B 5/3912* (2013.01); *G11B 5/112* (2013.01); *G11B 5/1475* (2013.01); *G11B 5/3932* (2013.01); *G11B 5/6082* (2013.01)

(58) Field of Classification Search
CPC ............................. G11B 5/3912; G11B 5/3932
USPC .............................................. 360/319, 324.12
See application file for complete search history.

(56) References Cited

U.S. PATENT DOCUMENTS

| | | |
|---|---|---|
| 6,667,862 B2 | 12/2003 | Zhu |
| 7,035,062 B1 | 4/2006 | Mao et al. |
| 7,876,534 B2 | 1/2011 | Chou et al. |
| 8,284,527 B2 | 10/2012 | Yoshida et al. |
| 8,537,505 B2 * | 9/2013 | Shiimoto ............... B82Y 25/00 360/319 |
| 8,780,508 B2 | 7/2014 | Dimitrov et al. |
| 9,076,468 B1 * | 7/2015 | Keener ............... G11B 5/3932 |
| 9,269,381 B1 * | 2/2016 | Sapozhnikov ....... G11B 5/3912 |
| 9,449,621 B1 * | 9/2016 | Mauri .................. G11B 5/3951 |
| 2005/0146813 A1 * | 7/2005 | Oshima .................. B82Y 10/00 360/324.12 |
| 2006/0044701 A1 | 3/2006 | Funayama |
| 2006/0092582 A1 | 5/2006 | Gill et al. |
| 2006/0158789 A1 * | 7/2006 | Koyama ............... G11B 5/3912 360/321 |
| 2006/0230601 A1 | 10/2006 | Gill et al. |
| 2009/0034132 A1 | 2/2009 | Miyauchi et al. |
| 2009/0180217 A1 | 7/2009 | Chou et al. |
| 2010/0027167 A1 | 2/2010 | Gill et al. |

(Continued)

OTHER PUBLICATIONS

Jury, Jason C. et al., "Measurement and Analysis of Noise Sources in Giant Magnetoresistive Sensors Up to 6 GHz", IEEE Transactions on Magnetics, vol. 38, No. 5, Sep. 2002, 11 pages.

*Primary Examiner* — Jefferson Evans
(74) *Attorney, Agent, or Firm* — Westman, Champlin & Koehler, P.A.

(57) ABSTRACT

A reader having a bearing surface, a free layer, and a free layer biasing structure. The free layer biasing structure includes at least one side shield that applies a first bias field level to a front portion of the free layer that is nearest to the bearing surface and applies a second bias field level to a rear portion of the free layer that is farthest from the bearing surface. The second bias field level is greater than the first bias field level.

18 Claims, 8 Drawing Sheets

(56) References Cited

U.S. PATENT DOCUMENTS

| | | | |
|---|---|---|---|
| 2011/0051294 A1* | 3/2011 | Gao | B82Y 25/00 360/313 |
| 2011/0069417 A1 | 3/2011 | Kawamori et al. | |
| 2011/0279923 A1 | 11/2011 | Miyauchi et al. | |
| 2012/0134057 A1 | 5/2012 | Song et al. | |
| 2014/0004386 A1* | 1/2014 | Covington | G11B 5/3932 428/816 |
| 2014/0327989 A1* | 11/2014 | Sapozhnikov | G11B 5/3912 360/235.4 |
| 2014/0340793 A1* | 11/2014 | Song | G11B 5/11 360/319 |
| 2015/0092303 A1 | 4/2015 | Aoyama et al. | |
| 2015/0118520 A1* | 4/2015 | Ahn | G11B 5/332 428/815 |
| 2015/0221327 A1* | 8/2015 | Isowaki | G11B 5/3912 360/319 |

\* cited by examiner

READ HEAD FREE LAYER HAVING FRONT AND REAR PORTIONS BIASED AT DIFFERENT LEVELS

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities. However, many read transducer designs are such that the read transducers have to be scaled to substantially fit the dimensions of narrow data tracks in disc drives having a high recording density. Magnetic and/or electronic noise may increase with a reduction in read transducer size/volume to fit the dimensions of the narrow data tracks.

SUMMARY

The present disclosure relates to read heads that addresses challenges posed by high aspect ratio readers that may have high free layer non-linearity and noise. In one embodiment, a reader having a bearing surface, a free layer, and a free layer biasing structure is provided. The free layer biasing structure includes at least one side shield that applies a first bias field level to a front portion of the free layer that is nearest to the bearing surface and applies a second bias field level to a rear portion of the free layer that is farthest from the bearing surface. The second bias field level is greater than the first bias field level.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to magnetic readers/read heads that include one or more elements that are capable of mitigating magnetic noise that may be produced by a portion of a free layer of the reader. In some embodiments, a bias field applied to a back stripe area of the free layer is selectively increased by a suitable biasing element to reduce magnetic noise produced by that area of the free layer without negatively impacting readback signal amplitude. However, prior to providing additional details regarding the different embodiments, a description of an illustrative operating environment is provided below.

Figure 1:
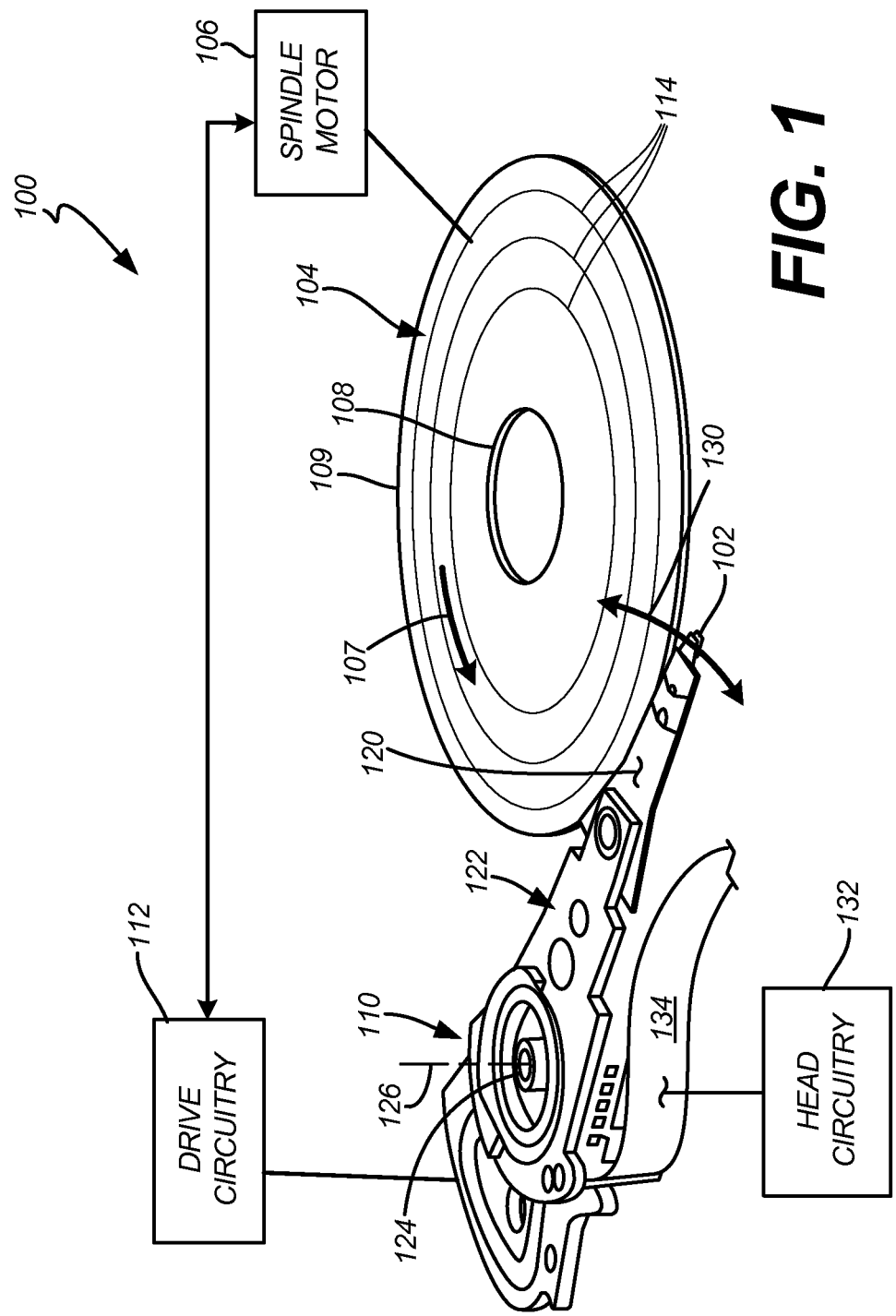
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
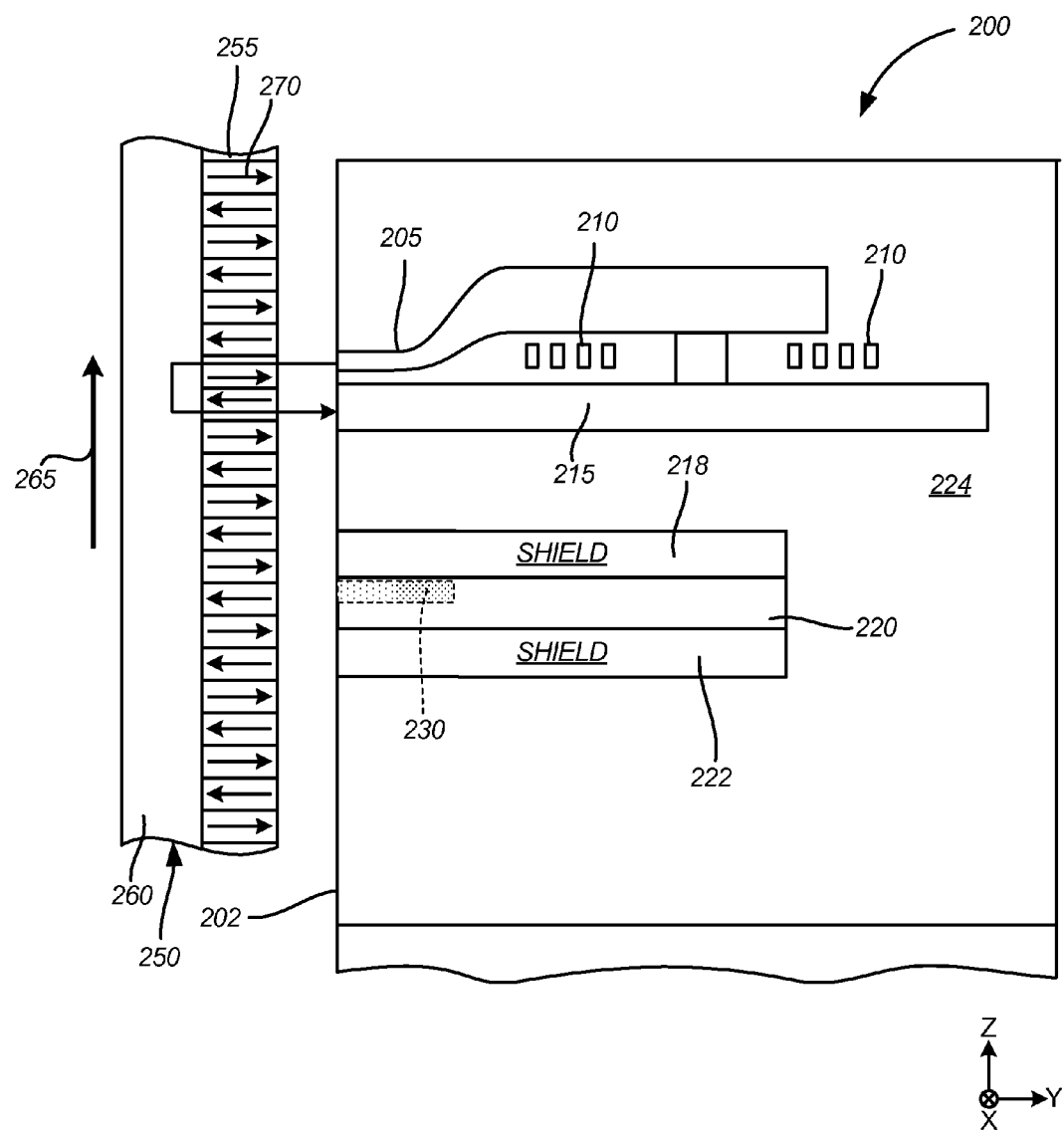
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
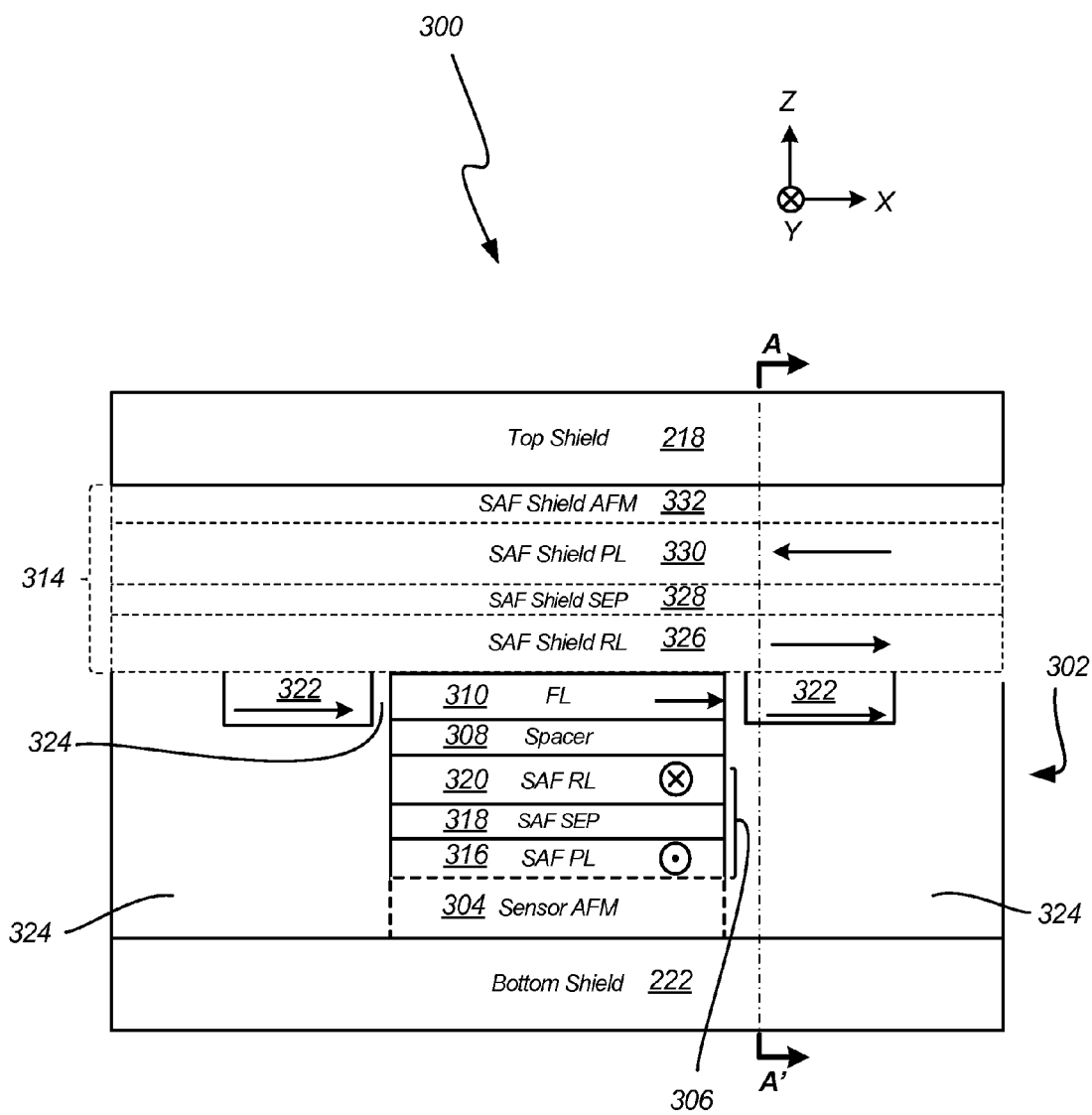
FIG. 3A is a bearing surface view of a magnetic reproducing device in accordance with a general embodiment.
Figure 3B:
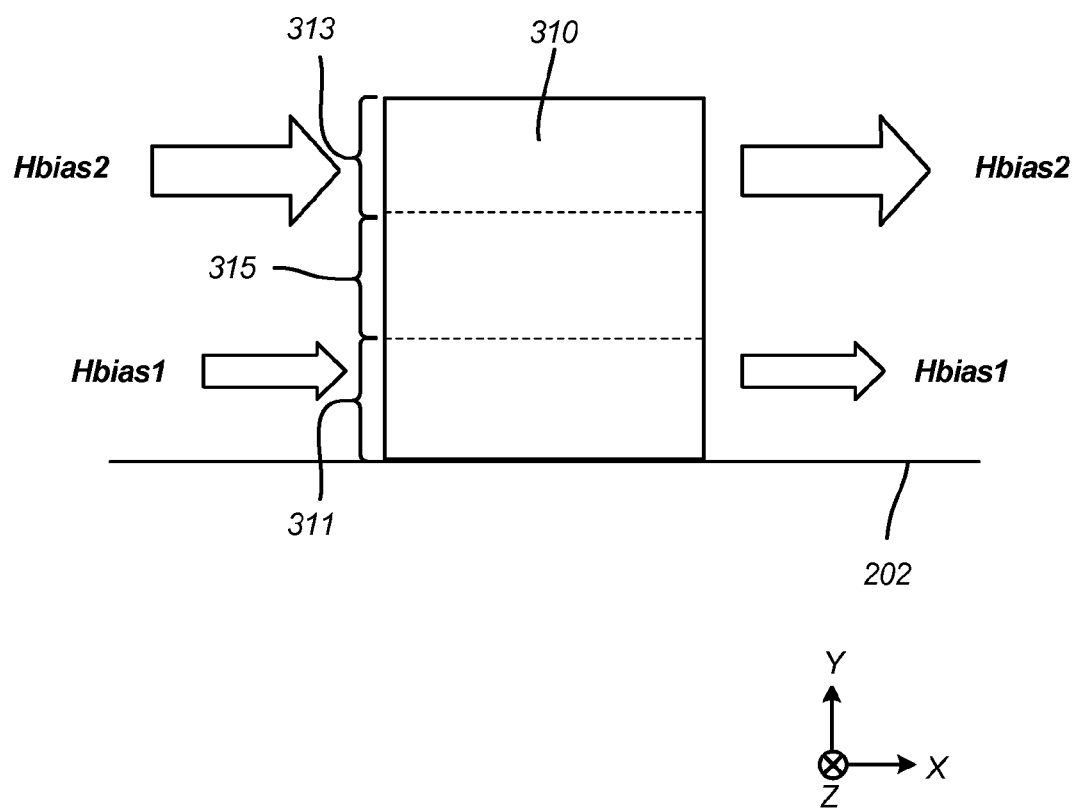
FIG. 3B is a top view of a free layer included in the device of FIG. 3A.

As will be described in detail further below, read transducer 220 has multiple layers including a sensing layer or free layer. The layers of the read transducer 220 may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. As indicated earlier, in some embodiments, a bias field applied to a back stripe area of the free layer is selectively increased by a suitable biasing element to reduce magnetic noise produced by that area of the free layer without negatively impacting read signal amplitude. Element 230 of FIG. 2 is progressively shaded darker from a portion nearest to bearing surface 202 to a rear portion of read transducer 220 to indicate a selective increase in the bias field applied to the back stripe area of the free layer. A bearing surface view of one reader embodiment is described below in connection with FIG. 3A, and a top view of the free layer of the reader embodiment of FIG. 3A showing selective biasing is illustrated in FIG. 3B. Thereafter, specific reader embodiments are described further below in connection with FIGS. 4-8. A method embodiment is described in connection with FIG. 9.

FIG. 3A is a schematic block diagram illustrating an example embodiment of read head 300 including a free layer biasing structure that applies a first bias field level to a front portion of the free layer that is nearest to a bearing surface and applies a second greater bias field level to a rear portion of the free layer that is farthest from the bearing surface. Read head 300 includes a magnetoresistive sensor 302 that is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor stack synthetic antiferromagnetic (SAF) structure 306, a spacer layer 308 and a free layer or sensing layer 310. In certain embodiments (not shown), free layer 310 may be a multi-layered structure. A stack cap layer (not shown) may also be included above the free layer. A sensor antiferromagnetic (AFM) layer 304 may optionally be included in some embodiments. Also, an SAF shielding structure 314 may optionally be included above the free layer 310 (or above the stack cap layer if included). Dashed lines are used to represent elements within structure 314 to indicate that structure 314 is optional. Also, dashed lines are used to indicate that AFM layer 304 is optional.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3A and anti-parallel to each other.

The magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. The bias is sufficiently small, however, that the magnetic moment of the free layer 310 can change in response to an applied magnetic field, such as a magnetic field of a data bit stored on the data discs. In some embodiments, the side biasing magnets or side shields 322 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, optional SAF shielding structure 314 includes a SAF shield reference layer 326, a thin SAF shield separation layer 328, which may comprise a metal such as Ru in some embodiments, a SAF shield pinned layer 330 and a SAF shield AFM layer 332. Because, in some embodiments, sensor 300 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 314, side shields 332 may be stabilized by shape anisotropy, by employing hard magnetic layers adjacent to the soft magnetic layers within side shield 332, or by any other suitable technique.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

Magnetic noise power ($S_v$) of a reader is inversely proportional to the square of the free layer bias field ($H_{bias}$):

$$S_v \propto 1/H_{bias}^2$$

Increasing the bias filed reduces magnetic noise but may also reduce a readback signal amplitude. However, selectively increasing the bias filed in the back stripe area of the reader will reduce magnetic noise without negatively impacting readback signal amplitude. As will be described further below in connection with FIGS. 3B and 3C, in reader 300, side shields 322 apply a first bias field level to a front portion of the free layer 310 that is nearest to the bearing surface and apply a second bias field level to a rear portion of the free layer 310 that is farthest from the bearing surface. The second bias field level is greater than the first bias field level.

FIG. 3B is a top view of free layer 310 of MR sensor 302 of FIG. 3A, which shows selective biasing of the free layer 310. As shown in FIG. 3B, a first bias field level $H_{bias1}$ is applied to a front portion 311 of the free layer 310, which is nearest to the bearing surface, and a second bias field level $H_{bias2}$ is applied to a back portion or back stripe area 313 of the free layer 310, which is farthest from the bearing surface. $H_{bias2}$ is greater than $H_{bias1}$. In some embodiments, a bias field applied to a portion 315 of the free layer, which is between the front portion 311 and the rear portion 313 may be at one or more transition bias field levels that may be between $H_{bias1}$ and $H_{bias2}$. In some embodiments, no transition bias field(s) may be employed and $H_{bias1}$ may be applied to a front half of the free layer 310, which may include portion 311 and a front half of portion 315, and $H_{bias2}$ may be applied to a rear half of the free layer 310, which may include a rear half of portion 315 and back stripe area 313. In general, any suitable biasing fields may be applied to reduce noise in the rear stripe area of the free layer 310 without negatively impacting readback signal amplitude.

As will be described further below, in one embodiment, the selective biasing of the free layer 310 may be carried out by varying a thickness of the side shield 322 in the stripe height direction to provide suitable selective biasing. In another embodiment, multilayer (for example, bilayer) side shields 322 with each shield 322 having, for example, a front stripe layer and a rear stripe layer may be employed. In embodiments with bilayer side shield shields 322, a magnetic moment value of the front stripe layer is less than a magnetic moment value of the rear stripe layer. In yet another embodiment, a relatively high bias field is provided to the rear stripe area of the free layer by 310 by providing side shields 322 that have a stripe height that is greater than the stripe height of the free layer 310. In still another embodiment, to provide the selective biasing, side shields 322 are spaced from the free layer 310 by a first distance at the bearing surface 202 and by a second distance at a location spaced from the bearing surface, with the second distance being less than the first distance. In certain embodiments, noise reduction at the rear portion 313 of the free layer 310 may be carried out by reducing a magnetic moment of the rear portion 313 of the free layer 310 relative to a magnetic moment of the front portion 311 of the free layer. This may carried out by, for example, doping a magnetic moment reduction material into the material of the free layer 310 at the rear portion 313 of the free layer 310. It should be noted that two or more different embodiments may be combined in certain applications.

Figure 4:
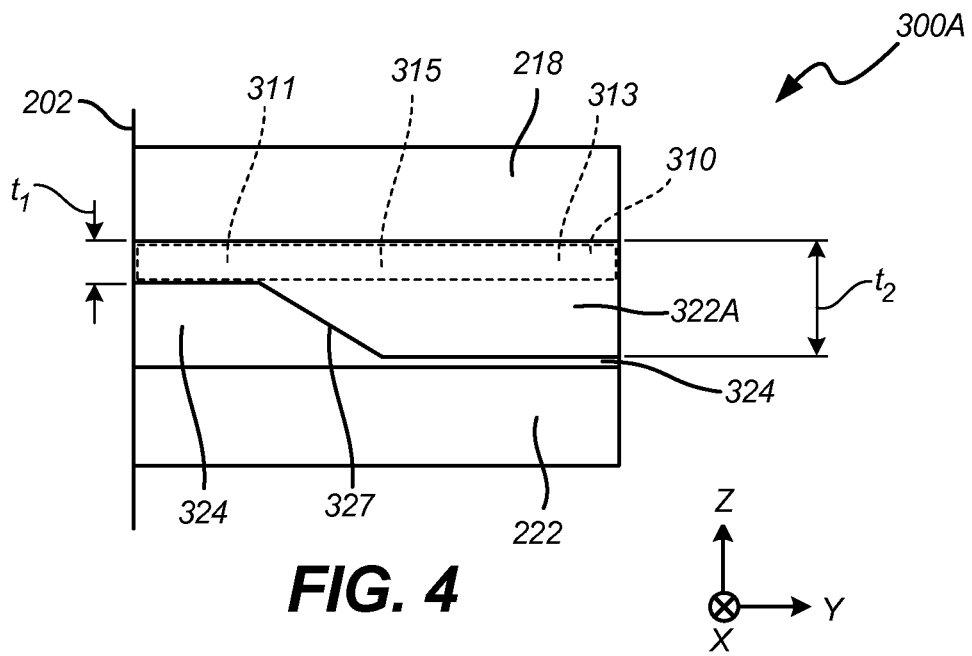
FIGS. 4-8 illustrate different views of different particular reader embodiments.

FIG. 4 is a sectional view of a read head 300A (a first particular embodiment of reader 300) as taken along line A-A' (i.e., through a plane orthogonal to the bearing surface and the layers of the sensor stack) in FIG. 3A. As can be seen in FIG. 4, read head 300A includes side shield 322A that has different thicknesses along its stripe height. Specifically, side shield 322A has a first thickness ($t_1$) nearest to the bearing surface 202 and a second thickness ($t_2$) farthest from the bearing surface. The first thickness, $t_1$, is substantially commensurate with a thickness of the free layer 310, which is represented by a dashed rectangular box in FIG. 4 since it is hidden in the sectional view. The front portion of the side shield 322 provides the first bias field level, $H_{bias1}$, to portion 311 of the free layer 310. The second thickness, $t_2$, is greater than the first thickness, $t_1$, in order to provide the second bias field level $H_{bias2}$. Side shield 322A may also include a beveled portion 327 that is on a side of region 315 of the free layer 310. The beveled portion may provide intermediate bias field levels between $H_{bias1}$ and $H_{bias2}$. It should be noted that, in certain embodiments, no beveled portion 327 may be employed and the entire stripe height of the side shied 322A may be divided into first and second portions of thicknesses $t_1$ and $t_2$, respectively, with the portion having thickness $t_2$ being behind the portion having the thickness $t_1$. The entire side shield 322A may be formed of a same material (for example, an alloy of Ni and Fe). Side shields 322A may be formed by any suitable technique.

Figure 5:
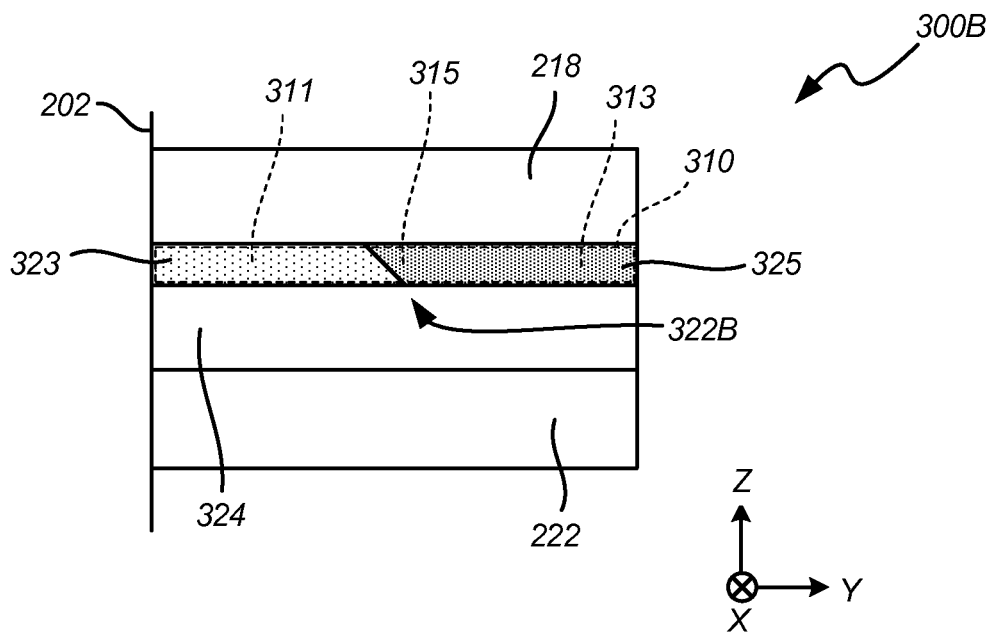

FIG. 5 is a sectional view along a line similar to the sectional view of FIG. 4 of a read head 300B in accordance with a second particular embodiment of reader 300. In reader 300B, side shield 322B, which is between top shield 218 and bottom shield 222, may have a substantially same thickness along its entire stripe height. In reader 300B, in order to provide $H_{bias1}$ at the front portion 311 of the free layer 310 and to provide $H_{bias2}$ at the rear portion 313 of the free layer 310, bilayer side shield shields 322B that each have a front stripe layer 323 and a rear stripe layer 325 may be employed. A magnetic moment value of the front stripe layer 323 is less than a magnetic moment value of the rear stripe layer 325. In some embodiments, layer 323 may be formed of a material such as NiFe and layer 325 may be formed of a material having a higher magnetic moment than NiFe. In such embodiments, examples of relatively high-moment materials that can be utilized for the magnetic layer 325 are CoFe and CoNiFe. Of course, other high-moment magnetic materials may also be suitable to obtain an $H_{bias2}$ value that is greater than $H_{bias1}$. In some embodiments, portions of layers 323 and 325 may overlap in region 315 as shown in FIG. 5.

Figure 6A:
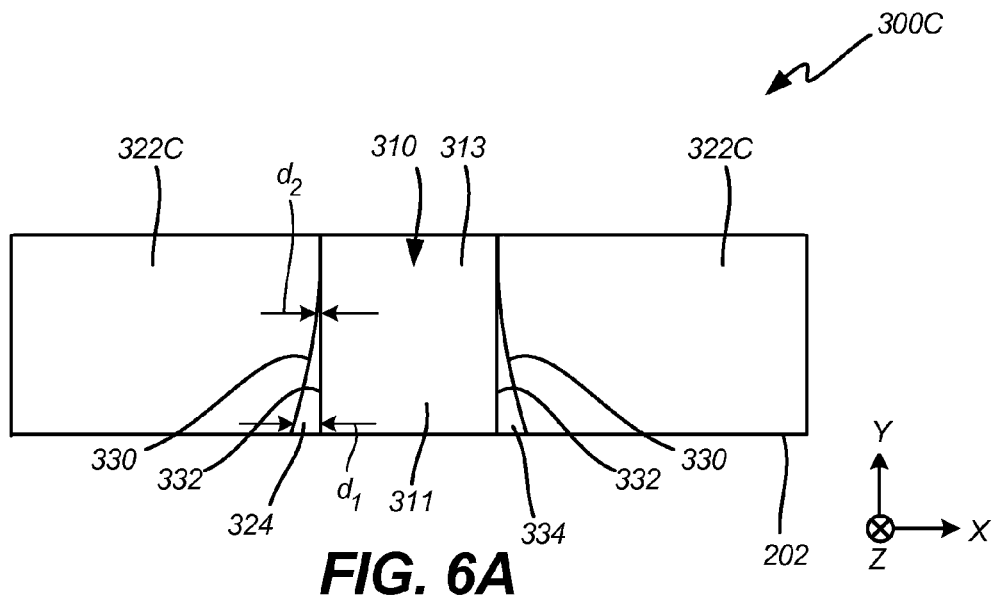
Figure 6B:
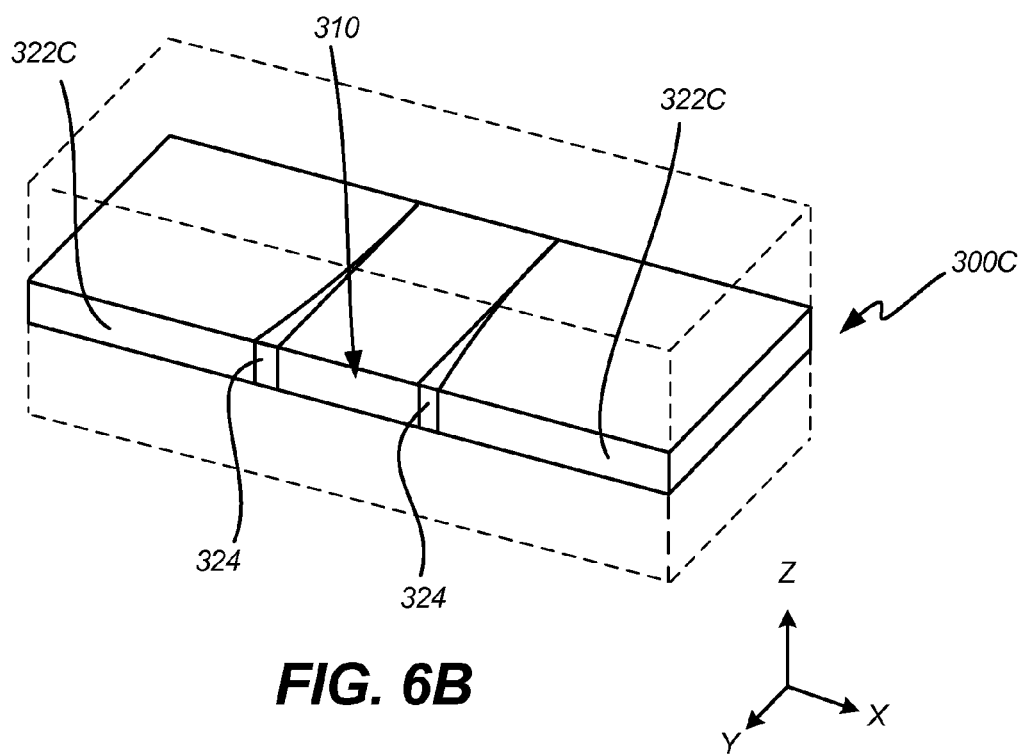

FIG. 6A is a top view of a free layer 310 and side shields 322C of a read head 300C in accordance with a third particular embodiment of reader 300. In the interest of simplification, other layers of read head 300C are not shown in FIG. 6A. As indicated earlier, insulating layers 324 are disposed in a gap between the free layer 310 and each of the side shields 322C. As illustrated in FIG. 6A, edges 330 of the side shields 322C are not parallel with respect to edges 332 of the free layer 310, but rather, are angled with respect thereto to form a tapered shape therebetween. In the embodiment shown in FIG. 6A, the edges 330 of the side shields 322C are tapered such that distance between the side shields 322C and the free layer 380 is greatest adjacent to the bearing surface 202 at gap $d_1$, and decreases in a direction away from the bearing surface 202. Thus, gap $d_1$ is greater than gap $d_2$. The tapered or variable edge distances between the side shields 322C and the free layer 310 increases the strength of a side shield biasing effect on the free layer 310 at, for example, a location spaced from the bearing surface due to the relatively smaller distance of the gap $d_2$, for example. In certain embodiments, instead of a tapered shape between edges 330 of the side shields 322C and edges 332 of the free layer 310, a stepped shape (or any other suitable shape) may be formed as long as $d_1$ is greater than $d_2$. FIG. 6B shows a perspective view of a portion of read head 300C illustrating free layer 310, side shields 322C and insulating layers 324. The dashed boxes above and below these layers in FIG. 6B indicate that additional layers above and below the free layer 310, side shields 322C and insulating layers 324 are present but are not separately shown.

Figure 7:
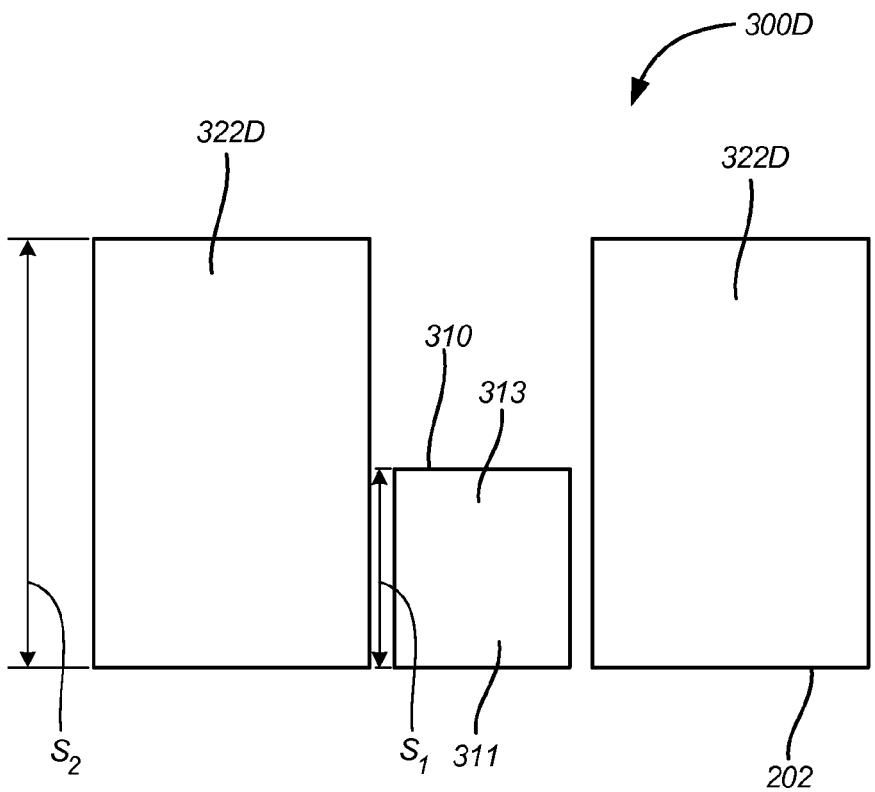

FIG. 7 is a top view of a free layer 310 and side shields 322D of a read head 300D in accordance with a fourth particular embodiment of reader 300. In the interest of simplification, other layers of read head 300D are not shown in FIG. 7. As can be seen in FIG. 7, edges 330 of side shields 322D are substantially parallel to edges 332 of free layer 310. However, free layer 310 has a first stripe height, $S_1$, and side shields 322D have a second stripe height, $S_2$, which is greater than $S_1$. Employing side shields 322D having greater stripe heights than the free layer 310 provides $H_{bias2}$ to portion 313 of the free layer 310 and provides $H_{bias1}$ to portion 311 of the free layer 310, which is desirable for reasons provided earlier. In some embodiments, $S_2$ may be at least twice $S_1$.

Figure 8:
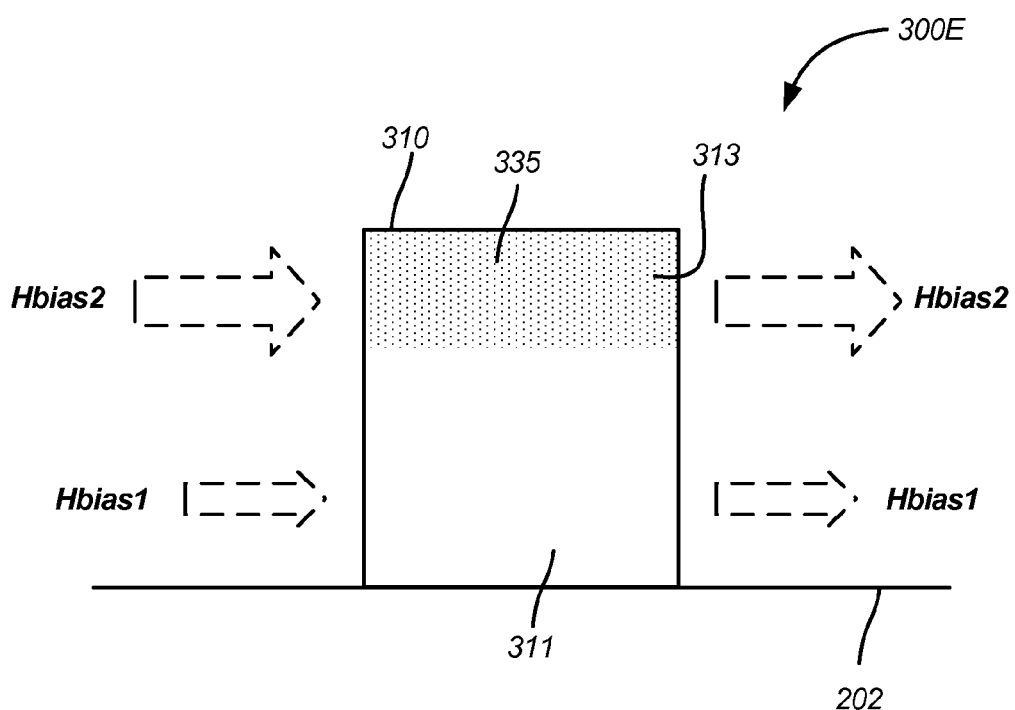

FIG. 8 is a top view of a free layer 310 of a read head 300E in accordance with a fifth particular embodiment of reader 300. In the interest of simplification, other layers of read head 300E are not shown in FIG. 8. In reader 300E, noise reduction at the rear portion 313 of the free layer 310 may be carried out by reducing a magnetic moment of the rear portion 313 of the free layer 310 relative to a magnetic moment of the front portion 311 of the free layer. This may carried out by, for example, doping a magnetic moment reduction material into the material of the free layer 310 at the rear portion 313 of the free layer 310. In general, any suitable free layer stripe height reduction element 335 may be utilized to reduce a magnetic moment of the rear portion 313 of the free layer 310 relative to a magnetic moment of the front portion 311 of the free layer. In some embodiments, in addition to the free layer stripe height reduction element 335, $H_{bias1}$ and $H_{bias2}$ may also be provided in read head 300E. Dashed lines for the arrows $H_{bias1}$ and $H_{bias2}$ in FIG. 8 indicate that these features are optional in reader 300E. Any biasing structures in the above-described embodiments, and the free layer stripe height reduction element 335, are examples of magnetic noise reduction elements in this disclosure.

Figure 9:
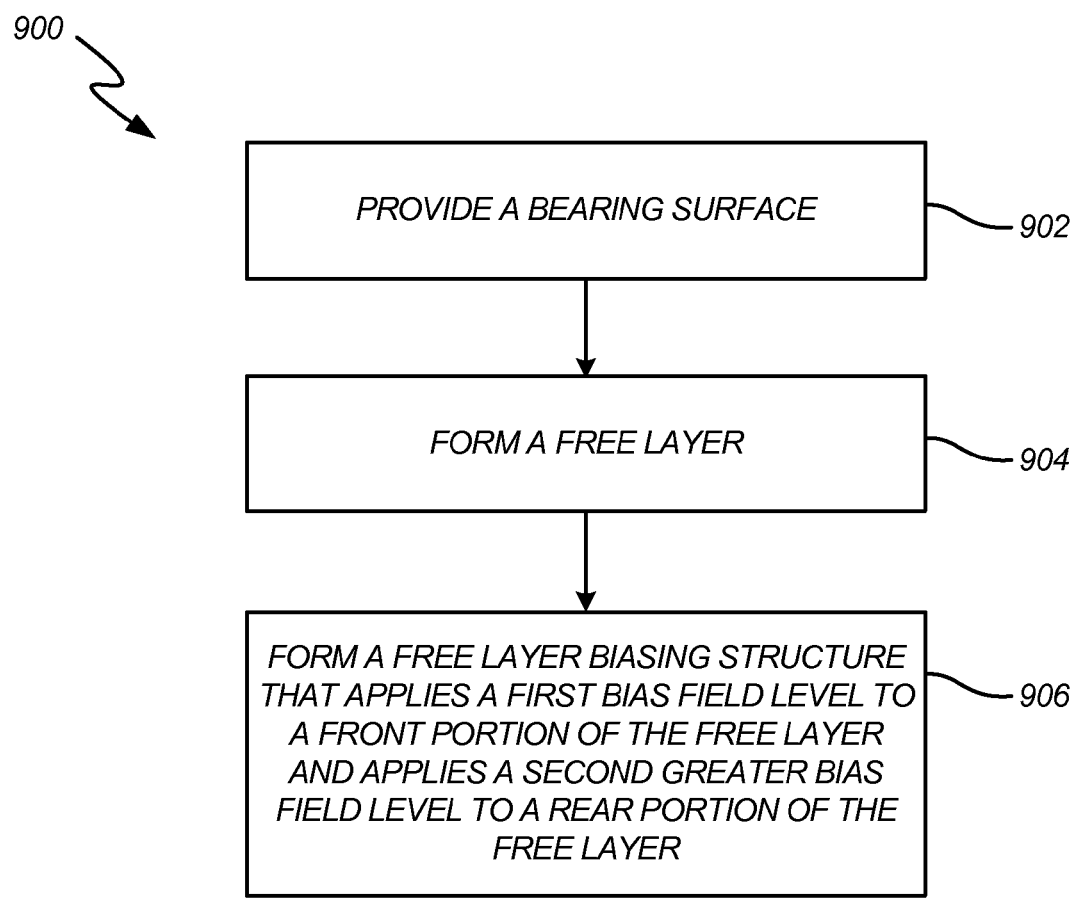
FIG. 9 is a flow diagram of a method embodiment.

FIG. 9 is a simplified flow diagram 900 of a method embodiment. At step 902, a bearing surface is provided. A free layer is formed at step 904. At step 906, a free layer biasing structure is formed. The field layer biasing structure is capable of applying a first bias field level to a front portion of the free layer that is nearest to the bearing surface and capable of applying a second bias field level, which is greater than the first bias field level, to a rear portion of the free layer that is farthest from the bearing surface. It should be noted that the method steps of flow diagram 900 may be carried out in any suitable order. Also, the different method steps of flow diagram 900 may be carried out at different points in time. For example, in some embodiments, the bearing surface of step 902 may be formed by a mechanical lapping process the may be carried out well after the remaining method steps.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reader comprising:
  a bearing surface;
  a bottom shield having a front portion that is nearest to the bearing surface and a rear portion that is farthest from the bearing surface;
  a top shield substantially parallel to the bottom shield, the top shield having a front portion that is nearest to the bearing surface and a rear portion that is farthest from the bearing surface, wherein a separation distance between the front portion of the top shield and the front portion of the bottom shield corresponds to a separation distance between the rear portion of the top shield and the rear portion of the bottom shield;
  a free layer; and
  a free layer biasing structure comprising at least one side shield formed of a soft magnetic material and in contact with the top shield at both the front portion of the top shield and the rear portion of the top shield, the at least one side shield configured to apply a first bias field level to a front portion of the free layer that is nearest to the bearing surface and configured to apply a second bias field level to a rear portion of the free layer that is farthest from the bearing surface, wherein the second bias field level is greater than the first bias field level.

2. The reader of claim 1 and wherein the free layer biasing structure is configured to apply a graded bias field to the free layer that increases from the first bias field level to the second bias field level, and wherein the graded bias field comprises a third bias field level to be applied to a portion of the slider that is between the front portion and the rear portion, and wherein the third bias field level is between the first bias field level and the second bias field level.

3. The reader of claim 1 and wherein the at least one side shield comprises a front portion that is nearest to the bearing surface and a rear portion that is farthest from the bearing surface, and wherein the front portion of the at least one side shield has a first thickness and the rear portion on the at least one side shield has a second thickness, and wherein the first thickness is less than the second thickness.

4. The reader of claim 3 and wherein a thickness of the free layer and the first thickness of the front portion of the at least one side shield are substantially commensurate.

5. The reader of claim 3 and wherein the at least one side shield comprises a beveled portion between the front portion of the at least one shield and the rear portion of the at least one shield.

6. The reader of claim 1 and wherein the at least one side shield comprises a front portion that is nearest to the bearing surface and a rear portion that is farthest from the bearing surface, and wherein the at least one side shield is a bilayer structure having a front stripe layer that comprises the front portion and a rear stripe layer that comprises the rear portion, and wherein a magnetic moment value of the front stripe layer is less than a magnetic moment value of the rear stripe layer.

7. The reader of claim 1 and wherein the free layer has a first stripe height and the at least one side shield has a second stripe height that is greater than the first stripe height.

8. The reader of claim 1 and wherein the at least one side shield is spaced from the free layer by a first distance at the bearing surface and a second distance at a location spaced from the bearing surface, wherein the second distance is less than the first distance.

9. The reader of claim 8 and wherein the at least one side shield comprises a front portion that is nearest to the bearing surface and a rear portion that is farthest from the bearing surface, and wherein the rear portion of the free layer contacts the rear portion of the at least one side shield.

10. A method of forming a reader comprising:
  providing a bearing surface;
  forming a bottom shield having a front portion that is nearest to the bearing surface and a rear portion that is farthest from the bearing surface;
  forming a top shield substantially parallel to the bottom shield, the top shield having a front portion that is nearest to the bearing surface and a rear portion that is farthest from the bearing surface, wherein a separation distance between the front portion of the top shield and the front portion of the bottom shield corresponds to a separation distance between the rear portion of the top shield and the rear portion of the bottom shield;
  forming a free layer; and
  forming a free layer biasing structure that includes at least one side shield comprising a soft magnetic material and in contact with the top shield at both the front portion of the top shield and the rear portion of the top shield, the at least one side shield is capable of applying a first bias field level to a front portion of the free layer that is nearest to the bearing surface and capable of applying a second bias field level, which is greater than the first bias field level, to a rear portion of the free layer that is farthest from the bearing surface.

11. The method of claim 10 and further comprising:
  applying, by the free layer biasing structure, a graded bias field to the free layer that increases from the first bias field level to the second bias field level,
  wherein applying the graded bias field comprises applying a third bias field level to a portion of the free layer that is between the front portion and the rear portion, and wherein the third bias field level is between the first bias field level and the second bias field level.

12. The method of claim 10 and wherein forming the free layer biasing structure that includes the at least one side shield comprises:
  forming a front portion of the at least one side shield of a first thickness and positioned nearest to the bearing surface; and
  forming a rear portion of the at least one shield of a second thickness and positioned farthest from the bearing surface,
  wherein the first thickness is less than the second thickness.

13. The method of claim 12 and wherein forming the at least one side shield further comprises forming a beveled portion between the front portion of the at least one shield and the rear portion of the at least one shield.

14. The method of claim 10 and wherein forming the free layer biasing structure that includes the at least one side shield comprises:
  forming the at least one side shield as a bilayer structure that includes a front stripe layer that comprises a front portion that is nearest to the bearing surface and a rear stripe layer that comprises a rear portion that is farthest from the bearing surface, and wherein a magnetic moment value of the front stripe layer is less than a magnetic moment value of the rear stripe layer.

15. The method of claim 10 and further comprising:
  forming the free layer having a first stripe height; and
  forming the at least one side shield having a second stripe height, wherein the second stripe height is greater than the first stripe height.

16. The method of claim 10 and further comprising:
spacing the at least one side shield from the free layer by a first distance at the bearing surface and a second distance at a location spaced from the bearing surface, wherein the second distance is less than the first distance.

17. The method of claim 16 and further comprising forming the at least one side shield with a rear portion, farthest from the bearing surface, that contacts the rear portion of the free layer.

18. A reader comprising:
a bearing surface;
a free layer having a front portion nearest to the bearing surface and a rear portion farthest from the bearing surface; and
a magnetic noise reduction element configured to restrict noise generation of a material of the free layer at the rear portion of the free layer,
wherein the magnetic noise reduction element comprises,
a modified free layer portion configured to substantially reduce a magnetic moment of the rear portion of the free layer relative to a magnetic moment of the front portion of the free layer, and wherein the modified free layer portion comprises a magnetic moment reduction material doped into the material of the free layer at the rear portion of the free layer;
at least one side shield configured to apply a first bias field level to a front portion of the free layer that is nearest to the bearing surface and configured to apply a second bias field level to a rear portion of the free layer that is farthest from the bearing surface, wherein the second bias field level in greater than the first bias field level, and wherein the at least one side shield comprises a front portion that is nearest to the bearing surface and a rear portion that is farthest from the bearing surface, and wherein the front portion of the at least one side shield has a first thickness and the rear portion on the at least one side shield has a second thickness, and wherein the first thickness is less than the second thickness.

* * * * *